US012334631B2

(12) United States Patent
Tanaka

(10) Patent No.: US 12,334,631 B2
(45) Date of Patent: Jun. 17, 2025

(54) COMMUNICATION DEVICE AND ANTENNA-INCORPORATED DEVICE

(71) Applicant: CANON KABUSHIKI KAISHA, Tokyo (JP)

(72) Inventor: Yu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 18/324,033

(22) Filed: May 25, 2023

(65) Prior Publication Data

US 2023/0387581 A1 Nov. 30, 2023

(30) Foreign Application Priority Data

May 26, 2022 (JP) ................................ 2022-086232

(51) Int. Cl.
*H01Q 1/42* (2006.01)
*H01Q 1/24* (2006.01)
*H01Q 9/16* (2006.01)

(52) U.S. Cl.
CPC ................ *H01Q 1/42* (2013.01); *H01Q 9/16* (2013.01)

(58) Field of Classification Search
CPC ........... H01Q 1/24; H01Q 1/245; H01Q 1/42; H01Q 5/321; H01Q 5/371; H01Q 9/065; H01Q 9/285; H01Q 9/16; H01Q 9/30; H01Q 21/29
See application file for complete search history.

(56) References Cited

FOREIGN PATENT DOCUMENTS

| | | | | |
|---|---|---|---|---|
| JP | 2003110329 A | | 4/2003 | |
| JP | 2012231266 A | * | 11/2012 | ............ H01Q 1/526 |

* cited by examiner

*Primary Examiner* — Hoang V Nguyen
(74) *Attorney, Agent, or Firm* — Canon U.S.A., Inc. IP Division

(57) ABSTRACT

A communication device includes a conductive housing and an antenna device arranged in the housing. The housing includes a first plane and a second plane facing the first plane, and a conductor of the first plane is provided with at least one aperture. The antenna device includes a first element including a first terminal and extending in a direction intersecting the first plane. The antenna device includes a second element including a first end, connected to the first element, and extending along the first plane. The first and second elements are overlapping the aperture in a direction vertical to the first plane, and a shortest distance from the first end of the second element to an end portion of the aperture is longer than a shortest distance from the first terminal of the first element to another end portion of the aperture in a direction vertical to the first plane.

11 Claims, 10 Drawing Sheets

COMMUNICATION DEVICE AND ANTENNA-INCORPORATED DEVICE

BACKGROUND OF THE INVENTION

Field of the Invention

The present disclosure relates to a communication device and an antenna-incorporated device.

Description of the Related Art

In a case where a wireless device that is used close to a human body is mounted, human body exposure to electromagnetic waves emitted from the antenna of the wireless device, that is, Specific Absorption Rate (SAR) is a problem. The SAR is proportional to the square of the electric field intensity of electromagnetic waves emitted from the wireless device, and the electric field intensity attenuates as the distance from the antenna is longer. Therefore, it is possible to reduce the SAR by mounting the antenna at a deep position in a housing so that a human body is separated from an estimated position. On the other hand, if the antenna is mounted at a deep position in the housing, the radiation efficiency of the antenna may decrease. Therefore, a technique of reducing the SAR without decreasing the radiation efficiency is required.

Japanese Patent Laid-Open No. 2003-110329 discloses, as arrangements for improving the gain as the radiation efficiency of an antenna and reducing the SAR, a method using a housing current suppression unit and a parasitic element and a method using, as a reflecting plate, part of a housing arranged behind an antenna when viewed from an aperture portion.

However, it may be impossible to ensure the mounting space of the antenna in the housing and to provide the housing current suppression unit and the parasitic element. Similarly, a sufficient distance from the antenna to the housing cannot be ensured, thereby making it impossible to obtain the effect of the reflecting plate. In this case, it is difficult to reduce the SAR while maintaining the good radiation characteristic of the antenna arranged in the housing.

SUMMARY OF THE INVENTION

According to one aspect of the present disclosure, communication device including a conductive housing and an antenna device, the antenna device arranged in the conductive housing, the housing including a first plane and a second plane facing the first plane, and a conductor of the first plane being provided with at least one aperture. The antenna device includes a first element including a first electric power supplying terminal and extending in a direction intersecting the first plane. The antenna device also includes a second element including a first open end, connected to the first element, and extending along the first plane, wherein the first element and the second element are arranged at positions overlapping the aperture in a direction vertical to the first plane, and a shortest distance from the first open end of the second element to an end portion of the aperture is longer than a shortest distance from the first electric power supplying terminal of the first element to another end portion of the aperture when viewed from a direction vertical to the first plane.

According to the present disclosure, it is possible to reduce the SAR while maintaining the good radiation characteristic of an antenna arranged in a housing.

Further features of the present disclosure will become apparent from the following description of exemplary embodiments (with reference to the attached drawings).

DESCRIPTION OF THE EMBODIMENTS

Figure 1:
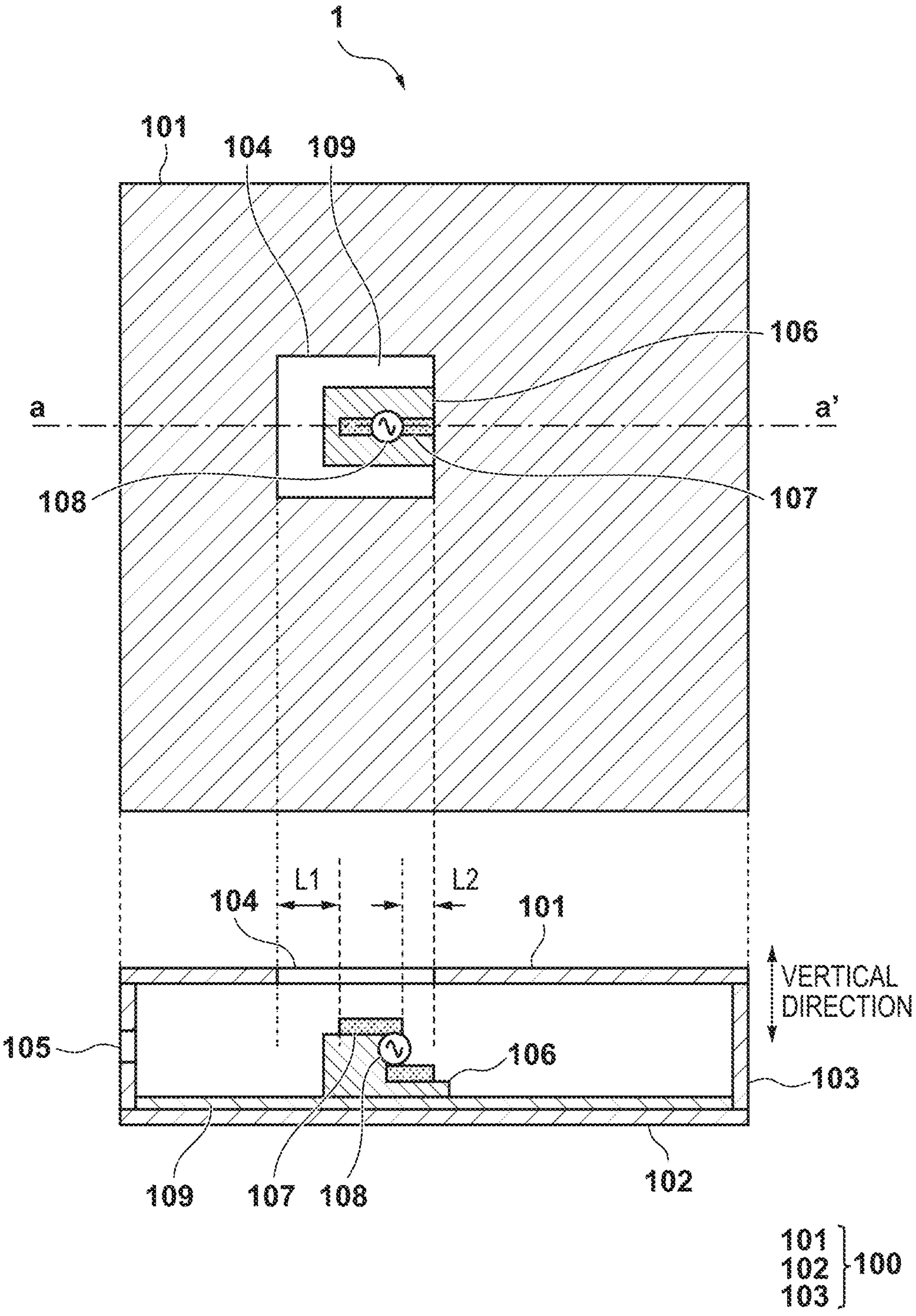
FIG. 1 is a view showing the arrangement of an antenna-incorporated device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following embodiments, a technique capable of reducing only the SAR while maintaining the good radiation characteristic of an antenna arranged in a housing where the mounting space of the antenna is limited will be described. There has been known a method of mounting an antenna in a narrow housing by bending part of the antenna like an inverted-F antenna while suppressing deterioration of the radiation characteristic such as radiation efficiency. However, if an inverted-F antenna is applied, the SAR may increase due to a change in antenna directivity, and it may be necessary to decrease the transmission output. To the contrary, the embodiments will explain a technique capable of adjusting the positional relationship between an antenna and a housing, more specifically, an aperture portion formed in the housing so as to obtain the balance between the radiation characteristic and the SAR.

The embodiments assume that a dielectric is made of Flame Retardant Type 4 (FR4) epoxy resin (FR4-epoxy), and a conductor is a copper thin film having a thickness of 35 μm or a steel material having a thickness of 1.5 mm, unless otherwise specified. For an electromagnetic field simulator used to calculate the SAR and the reflection characteristic of the antenna, the electric constants of FR4-epoxy and copper used in a general printed circuit board are used, and the steel material is defined as a perfect conductor.

A signal line that is connected to the antenna to transmit/receive high-frequency signals is a thin-wire coaxial cable. In the drawings, one end of the thin-wire coaxial cable is connected to an AC power supply. The thin-wire coaxial cable may be connected to the antenna via a balanced-unbalanced transformer (not shown) such as a balun that transforms an unbalanced connection into a balanced connection, or may be connected to the antenna without intervention of the balun.

Note that a phantom simulating the human body is made of a material of an electric constant defined by IEC. In a view showing the frequency characteristic of the reflection gain, an abscissa represents the frequency [GHz] and an ordinate represents the gain [dB]. In a view of the SAR distribution, an SAR value [mW/g] at each position in the phantom is indicated. The materials, material thicknesses, shapes, and other parameters described above are merely examples, and all parameters with which the same effect can be obtained are included in the embodiments.

First Embodiment

FIG. 1 shows a plan view of a housing of an antenna-incorporated device including an antenna and a sectional view of the housing taken along a line a-a' in the plan view according to this embodiment. An antenna-incorporated device 1 includes a housing 100, a support member 106, an antenna (antenna device) 107, an electric power supplying unit 108, and a substrate 109. The support member 106, the antenna 107, the electric power supplying unit 108, and the substrate 109 are arranged in the housing 100.

The housing 100 is a conductive housing formed from a conductor 101 of a top plane (first plane), a conductor 102 of a bottom plane (second plane) facing the conductor 101, and a conductor 103 that connects the conductors 101 and 102 in a thickness direction on the whole circumference. In this embodiment, the conductors 101, 102, and 103 are all made of a steel material, the conductors 101 and 102 have a size of 300 mm×300 mm in the plan view, and the conductor 103 has a size of 6 mm×1.5 mm in the sectional view. The conductor 101 includes an aperture portion of 60 mm×60 mm, and the conductor 103 includes an aperture portion of 60 mm (in a depth direction in the sectional view)×5 mm. Each aperture portion is covered and sealed with a resin portion 104 or 105 as a dielectric.

Note that the housing 100 has a substantially rectangular parallelepiped shape in FIG. 1 but the conductors 101 and 102 may have a cylindrical shape with a disk shape.

The support member 106 is a staircase-shaped dielectric, and is a holding portion arranged on the substrate 109 at a position where the antenna 107 overlaps the resin portion 104 in the plan view.

The antenna 107 is a dipole antenna, and is adhered to the support member 106 so that the electric power supplying unit 108 is vertical to the resin portion 104 to emit a high-frequency signal as an electromagnetic wave. As the area of the aperture where the resin portion 104 or 105 as a dielectric is arranged is larger, it is possible to improve the radiation characteristic of emitting the electromagnetic wave from the antenna 107 outside the antenna-incorporated device 1. In an example, each of the four sides of the resin portion 104 has a length of ½ or less of a wavelength λ of the electromagnetic wave transmitted/received by the antenna 107.

This embodiment assumes that a space for arranging the antenna 107 is ¼ or less of the wavelength of the electromagnetic wave transmitted/received in the vertical direction. In this case, there may be no space for arranging a reflecting plate or a parasitic element in the antenna 107. Therefore, in this embodiment, the SAR is reduced without largely changing the directivity of the antenna-incorporated device 1 by adjusting the shape of the antenna 107 and the positional relationship with the resin portion 104. Note that in an example, the thickness in the vertical direction of the housing 100 is ¼ or less of the wavelength of the electromagnetic wave transmitted/received by the antenna 107.

The substrate 109 is a wireless module in which an electric circuit (not shown) for controlling the operation of the housing and mounted components (not shown) are arranged, and serves as a high-frequency signal source that transmits/receives a high-frequency signal to be supplied to the electric power supplying unit 108. The substrate 109 is fixed to the conductor 102, and the substrate 109 and the electric power supplying unit 108 are connected by a coaxial line. Note that the substrate 109 may include a module having a function other than a function of transmitting/receiving a high-frequency signal, and may be formed by a plurality of substrates.

For example, if the antenna-incorporated device 1 is used for digital radiography or the like, the conductor 102 may be used as an irradiated plane that receives X-rays. In this case, an image processing circuit of the X-rays is included in the substrate 109.

Figure 2:
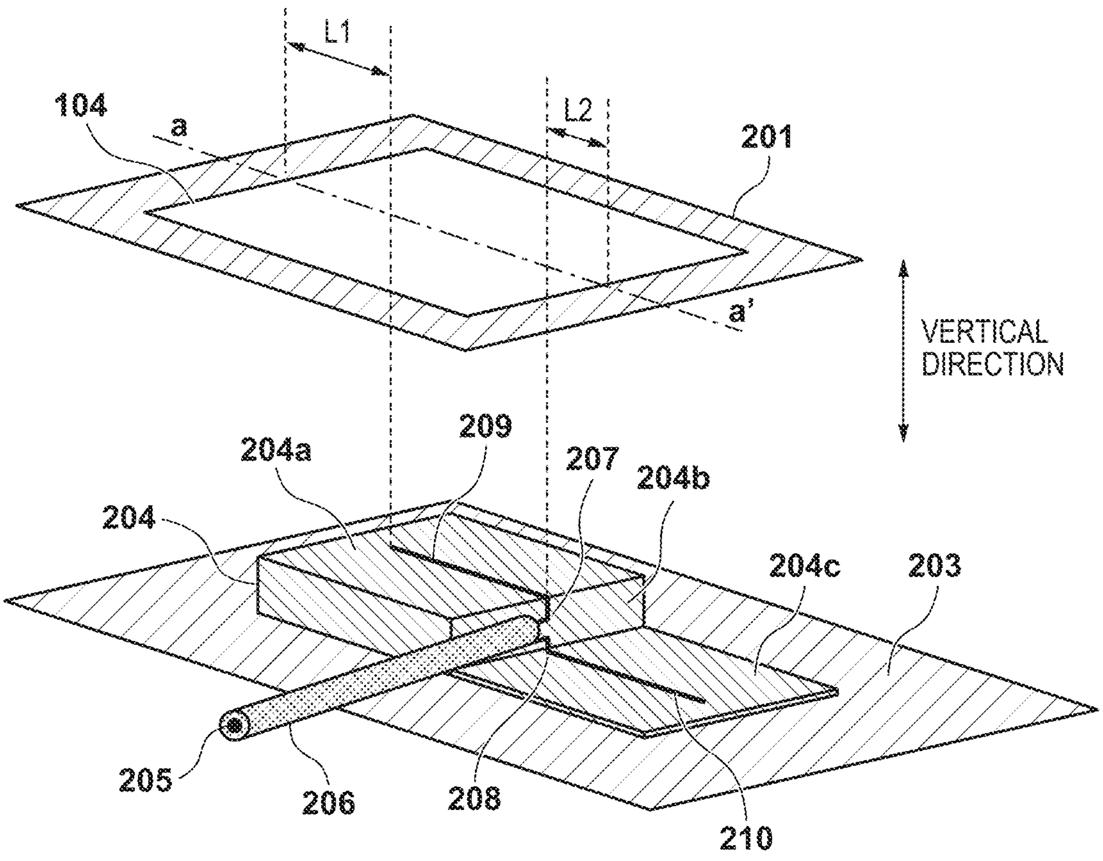
FIG. 2 is a view showing the positional relationship between an antenna and an aperture portion in FIG. 1.

FIG. 2 is an enlarged view of the resin portion 104, the support member 106, the antenna 107, and the electric power supplying unit 108 in FIG. 1. A conductor 201 represents part of the conductor 101 as the top plane of the housing 100, and a substrate 203 represents part of the substrate 109. The resin portion 104 is arranged to seal a rectangular aperture portion provided in the conductor 201, and the substrate 203 is arranged to face the resin portion 104. The substrate 203 may be a conductor such as another sheet metal arranged in the housing or the bottom plane of the housing.

A support member 204 as a dielectric includes two planes having different heights, that is, horizontal planes 204*a* and 204*c*, and further includes a vertical plane that connects the horizontal planes 204*a* and 204*c*, that is, a vertical plane 204*b*. The support member 204 corresponds to the support member 106 in FIG. 1.

A coaxial cable is formed from a core wire 205 and a jacket 206, and one end of the core wire 205 is connected to an antenna element (first element) 207 and one end of the jacket 206 is connected to an antenna element 208 (third element) on the vertical plane 204*b*. In the following description, portions of the core wire 205 and the jacket 206 respectively connected to the antenna elements 207 and 208 will be referred to as electric power supplying terminals. Note that although not shown in FIG. 2, a balun such as a sleeve balun may be provided near the connecting portions of the coaxial cable to the antenna elements 207 and 208.

The element 207 extends on the vertical plane 204*b* and is connected to an element 209 (second element) on the horizontal plane 204*a*, and the element 208 extends on the vertical plane 204*b* in a direction opposite to the element 207 and is connected to an element 210 (fourth element) on the horizontal plane 204*c*. Note that the extending directions of the elements 207 and 208 are opposite to each other in the example shown in FIG. 2 but they need only be different extending directions.

Note that the core wire 205 is connected to an RF line (not shown) through which the high-frequency signal of the substrate 109 flows, and the jacket 206 is connected to ground (not shown) of the substrate 109. A length obtained by adding the element lengths of the elements 207 and 209 is substantially equal to a length obtained by adding the element lengths of the elements 208 and 210, and each length is close to ¼ of the wavelength λ, of an RF signal transmitted/received by the high-frequency signal source. That is, in this embodiment, the dimensions of the elements 208 and 210 can be decided by deciding the sum of the element lengths of the elements 208 and 210 based on the design method of a half-wave dipole antenna and then adjusting the element lengths based on an input impedance and the like.

In this example, assume that the elements 207 to 210 are all conductors (copper thin films). However, the element may be coated with a resin material or the like to prevent alteration of the conductor caused by exposure to the air, or an adhesive layer for fixing the element to the support member 204 may be provided. For example, the element can also be bent along the support member 204 and adhered as a Flexible Printed Circuit (FPC) antenna. That is, the elements 207 to 210 may be made of a plurality of kinds of materials.

The support member 204 need only be arranged so that at least the elements 207 and 208 are vertical to the elements 209 and 210, and for example, the horizontal planes 204*a* and 204*c* may smoothly be connected. For example, the horizontal plane 204*a* and the vertical plane 204*b* and the vertical plane 204*b* and the horizontal plane 204*c* may respectively be connected by rounded corners each having a radius of curvature larger than 0, for example, a radius of curvature of 1 mm or more. In this case as well, the support member 204 can be arranged so that the elements 207 and 208 are vertical and the elements 209 and 210 are horizontal with respect to the resin portion 104.

At this time, the resin portion 104 is located in the upper portion of the support member 204, and L1 represents a length from the open end of the element 209 to the closest side (end portion) of the resin portion 104 in the extending direction of the element 209 when viewed from above in FIG. 2. Similarly, L2 represents a length from the end portion of the element 209 connected to the element 207 to the closest side (end portion) of the resin portion 104 in the extending direction of the element 209.

In this embodiment, assume that a relationship of L1>L2 holds. In this case, the vertical direction is a direction in which the gain of the antenna 107 increases, when viewed from the electric power supplying terminal. Therefore, in this embodiment, by arranging the resin portion 104 above the electric power supplying terminal in the vertical direction, L2≥0 is set so as not to inhibit radiation from the antenna 107.

Figure 3:
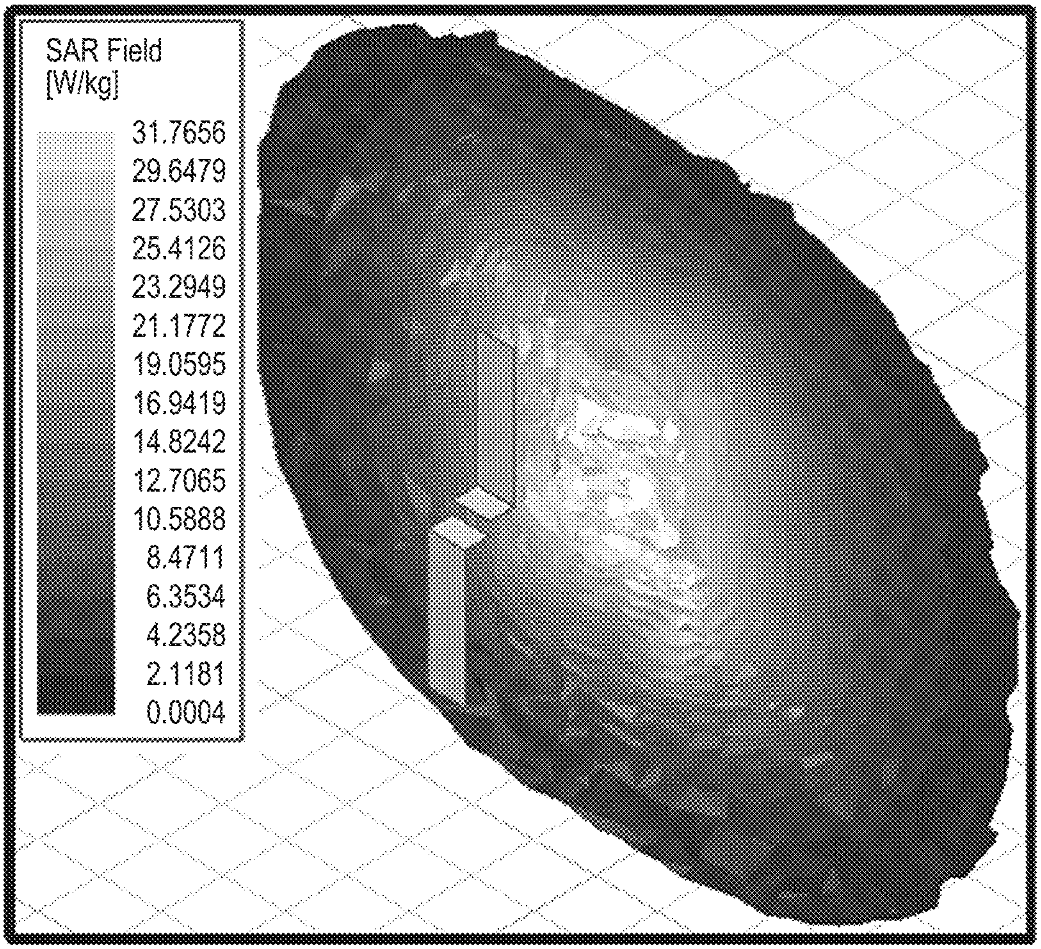
FIG. 3 is a view showing the SAR distribution of the antenna shown in FIG. 2.

FIG. 3 shows the distribution of the SAR value in a phantom arranged to face the antenna via the resin portion 104 when a height from the bottom plane of the support member 204 to the horizontal plane 204*a* in the vertical direction is 5 mm, and a height from the bottom plane of the support member 204 to the horizontal plane 204*c* is 1 mm. FIG. 3 shows such distribution that the SAR value is higher as the distance to the element 207 or 208 is shorter. The maximum value of the SAR is 31.77 mW/g in a case where a high-frequency signal of 1 W is input at a resonance frequency in the 5-GHz band in which S11 representing a reflection loss is −8 dB and radiation efficiency is −2 dB.

If observation is performed in the near field of the antenna 107, that is, at a position close to the resin portion 104 outside the housing 100, an electric field component in a direction parallel to the resin portion 104, that is, in the horizontal direction contributes to the SAR more than an electric field component in the vertical direction. This is because while an electric field component vertical to the resin portion 104, that is, the surface of the human body abruptly attenuates on the surface of the human body facing the housing 100 at an observation point, an electric field component parallel to the surface of the human body does not attenuate sufficiently, and dominantly acts on the SAR. If the elements 207 and 208 are arranged vertically with respect to the resin portion 104, the elements 207 and 208 emit electromagnetic waves in which the electric field components in the vertical direction with respect to the resin portion 104 are dominant. Thus, as compared with a case in which the antenna 107 does not have the elements 207 and 208, an electric field component parallel to the resin portion 104 can be attenuated, thereby reducing the SAR.

On the other hand, if observation is performed in the far field of the antenna 107, the maximum radiation direction of main beams, that is, electromagnetic waves emitted by the elements 207 to 210 needs to include a direction penetrating the resin portion 104, that is, the vertical direction. Therefore, each of the element lengths of the elements 207 and 208 on the vertical plane 204*b* needs to be ⅛ or less of the wavelength λ, and each of the element lengths of the elements 209 and 210 is longer than the element lengths of the elements 207 and 208. That is, the dimensions of the elements 207 to 210 are decided so the ratio of radiation of electromagnetic waves from the elements 207 and 208 to radiation of electromagnetic waves from the antenna 107 is not dominant. Thus, for example, in an application such as digital radiography, it is possible to reduce the SAR of the antenna-incorporated device 1 while maintaining the radiation direction of the electromagnetic waves.

Figure 4:
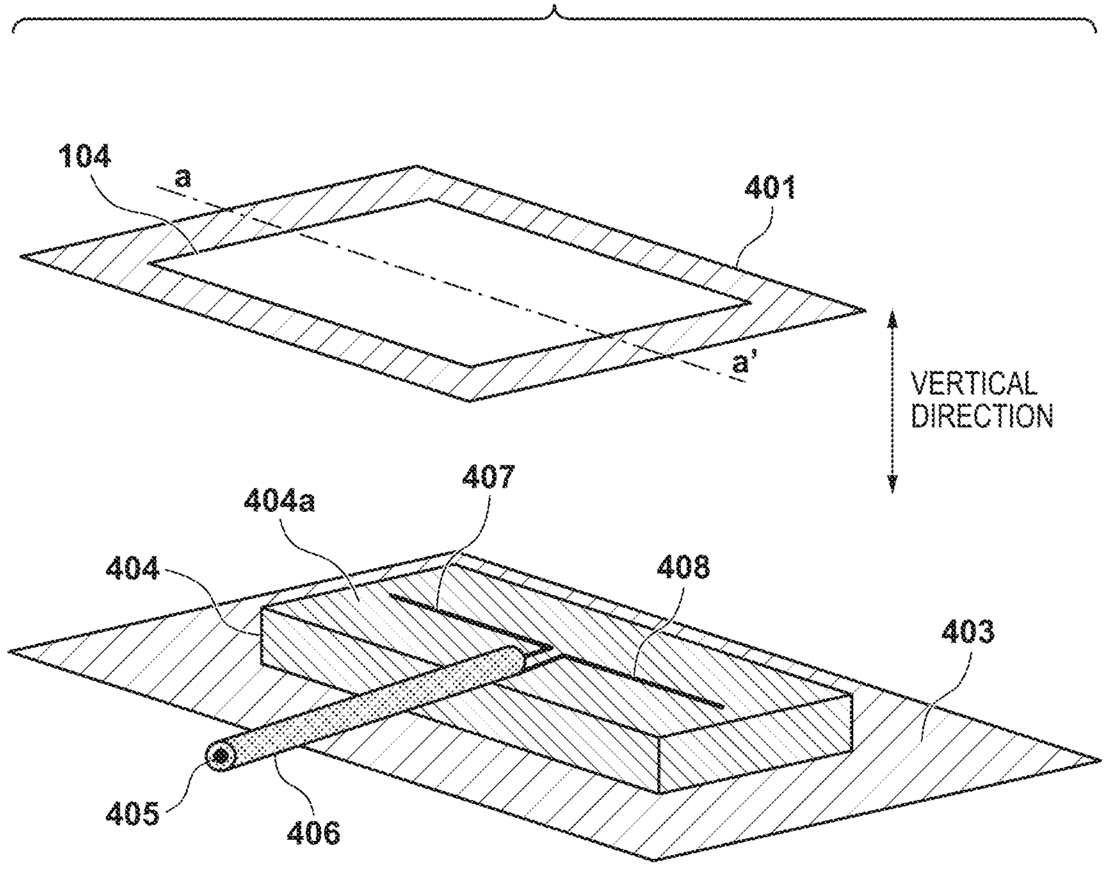
FIG. 4 is a view showing the arrangement of a conventional antenna.

For comparison, FIG. 4 shows an arrangement in which a dipole antenna that is not bent is arranged. The antenna 107 shown in FIG. 4 includes no elements extending in the vertical direction but elements 407 and 408 extending in the horizontal direction.

The resin portion 104 is arranged to cover an aperture arranged in a conductor 401 as the top plane of the housing 100, and a substrate 403 is arranged to face the resin portion 104 by extending in parallel to the resin portion 104. The conductors 401 and 403 are the same as the conductors 201 and 203 shown in FIG. 2 and a description thereof will be omitted.

A support member 404 as a dielectric includes a horizontal plane 404*a*. The elements 407 and 408 are arranged to extend along the resin portion 104.

A coaxial cable is formed from a core wire 405 and a jacket 406, and one end of the core wire 405 is connected to the element 407 of the antenna and one end of the jacket 406 is connected to the element 408 of the antenna on the horizontal plane 404*a*. Note that similar to FIG. 2, a balun such as a sleeve balun may be provided near the connecting portions of the coaxial cable to the elements 407 and 408. The elements 407 and 408 are conductors (copper thin films), and the element lengths are substantially equal to each other, and are about ¼ of the wavelength λ of an RF signal transmitted/received by the high-frequency signal source.

Figure 5:
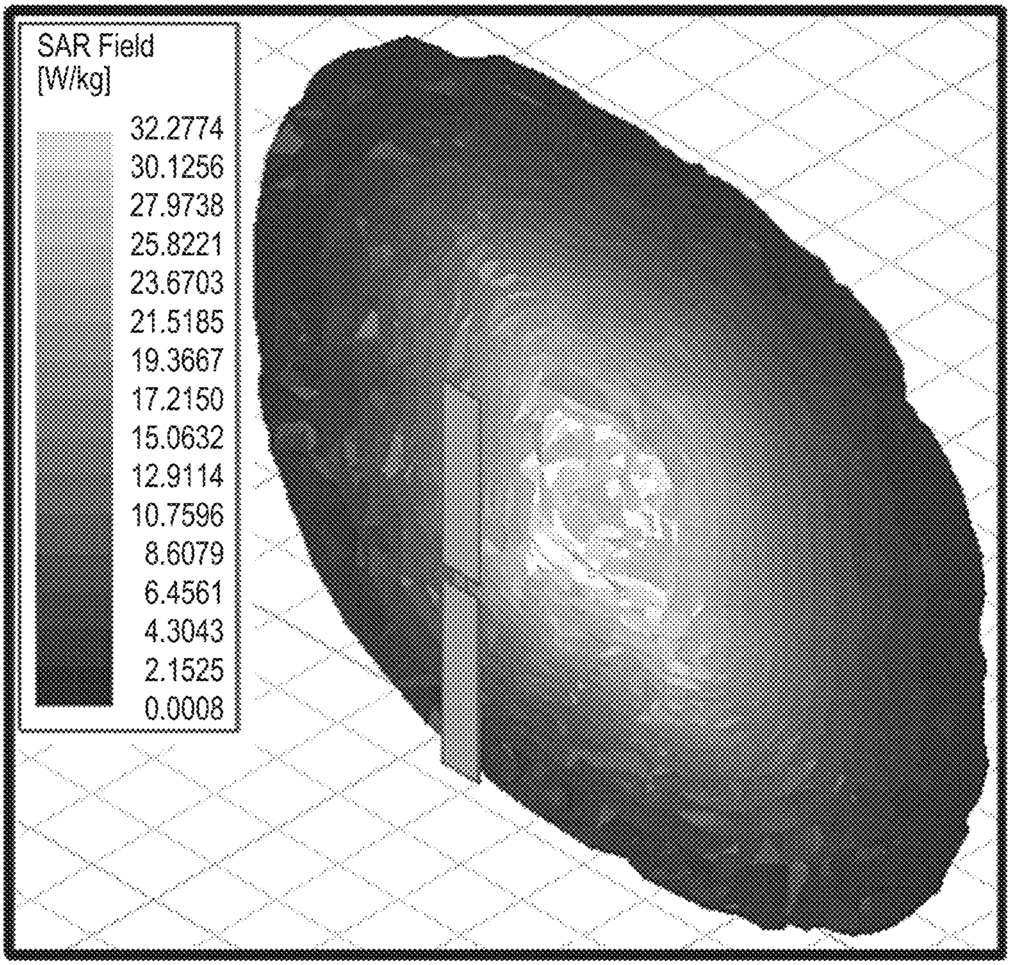
FIG. 5 is a view showing the SAR distribution of the antenna shown in FIG. 4.

FIG. 5 shows an SAR distribution in a phantom arranged to face the antenna via the resin portion 104 when a height from the bottom plane of the support member 404 to the horizontal plane 404*a* in the vertical direction is 3 mm. Assume that the calculation condition of the SAR distribution is same as that in FIG. 3.

Referring to FIG. 5, if 1 W is input, the SAR value is 32.27 mW/g, which is higher than the SAR value in FIG. 3.

That is, with the arrangement shown in FIG. 2, it is possible to reduce the SAR while maintaining the radiation efficiency of the antenna 107, as compared with the arrangement shown in FIG. 4.

(First Modification)

Figure 6:
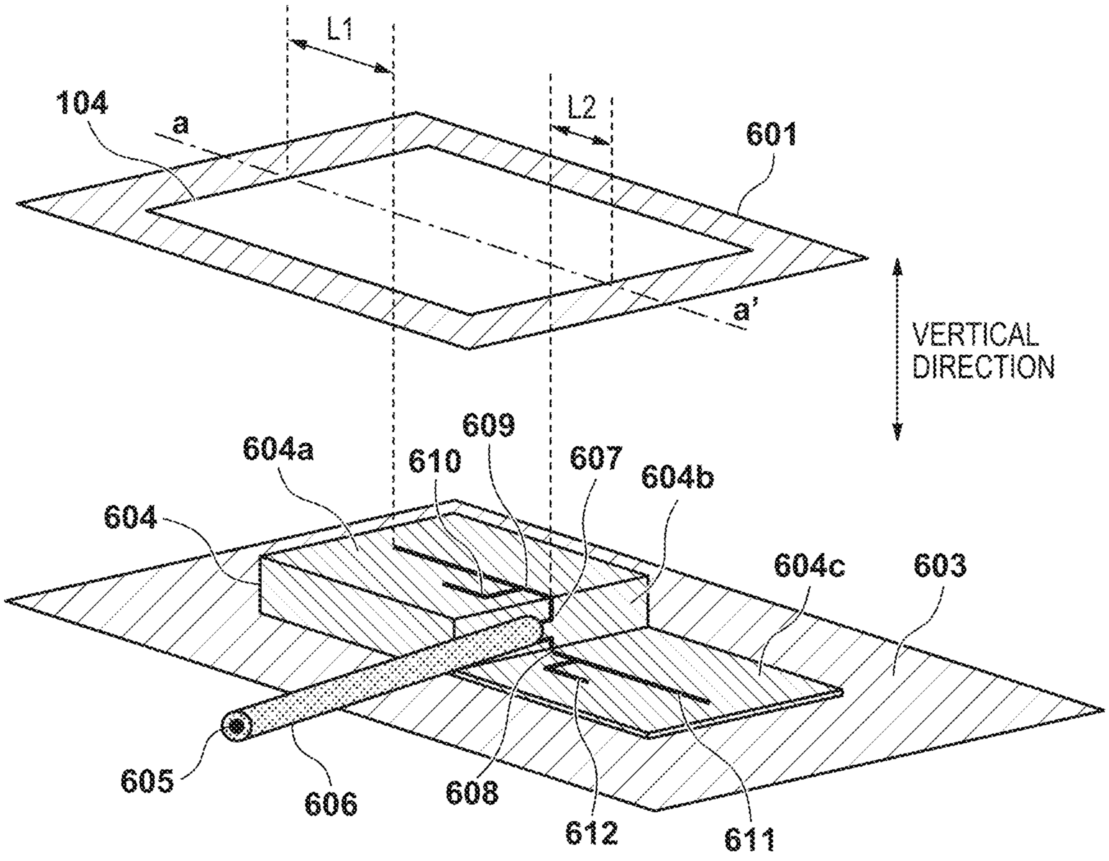
FIG. 6 is a view showing a modification of the antenna-incorporated device according to the first embodiment.

FIGS. 1 to 5 assume that the antenna 107 is a dipole antenna designed for a single frequency band. However, the antenna 107 may be designed to operate in a plurality of frequency bands. FIG. 6 shows a modification in a case where a branch-shaped dipole antenna is applied to the antenna 107 to operate in a plurality of frequency bands. This modification assumes that the antenna 107 is a two-branch dipole antenna to operate in dual bands.

In FIG. 6, a conductor 601 represents part of the conductor 101 as the top plane of the housing 100, and there exists a substrate 603 as part of the substrate 109 arranged to face the conductor 601 in parallel. Similar to the substrates 203 and 403, the substrate 603 may be a conductor such as another sheet metal arranged in the housing 100 or the bottom plane of the housing 100.

A support member 604 as a dielectric includes two planes having different heights, that is, horizontal planes 604*a* and 604*c*, and further includes a vertical plane that connects the horizontal planes 604*a* and 604*c*, that is, a vertical plane 604*b*. Assume that the planes 604*a* to 604*c* are the same as the planes 204*a* to 204*c*, respectively.

A coaxial cable is formed from a core wire 605 and a jacket 606, and one end of the core wire 605 is connected to an antenna element 607 and one end of the jacket 606 is connected to an antenna element 608 on the vertical plane 604*b*.

The element 607 extends on the vertical plane 604*b*, and is connected to an element 609 and an element 610 branched from the element 609 on the horizontal plane 604*a*. The element 608 extends on the vertical plane 604*b* in a direction opposite to the element 607, and is connected to an element 611 and an element 612 branched from the element 611 on the horizontal plane 604*c*.

Note that the element 609 is longer than the element 610, and the element 611 is longer than the element 612. The elements 607 to 612 are all conductors (copper thin films).

A length obtained by adding the element lengths of the elements 607 and 609 is substantially equal to the total length of the element lengths of the elements 608 and 611, and each length is close to λl/4 where λl represents the wavelength of a radio signal on a low frequency side among RF signals transmitted/received by the high-frequency signal source. Furthermore, a length obtained by adding the element lengths of the elements 607 and 610 is substantially equal to a length obtained by adding the element lengths of the elements 608 and 612, and each length is close to λh/4 where λh represents the wavelength of a radio signal on a high frequency side among the RF signals transmitted/received by the high-frequency signal source.

As a result, the elements 607 and 608 are arranged vertically with respect to the resin portion 104, and the elements 609 to 612 are arranged horizontally with respect to the resin portion 104.

Similar to FIG. 2, since a height from the bottom plane of the support member 604 to the horizontal plane 604*a* in the vertical direction is 5 mm, each of the element lengths of the elements 607 and 608 on the vertical plane 604*b* is ⅛ or less of the wavelength λh on the high frequency side. Each of the element lengths of the elements 609 and 610 is longer than that of the element 607, and each of the element lengths of the elements 611 and 612 is longer than that of the element 608. This can reduce the SAR of the antenna-incorporated device 1 without largely changing the directivity.

In this modification as well, assume that L1>L2 and L2≥0.

(Second Modification)

Figure 7:
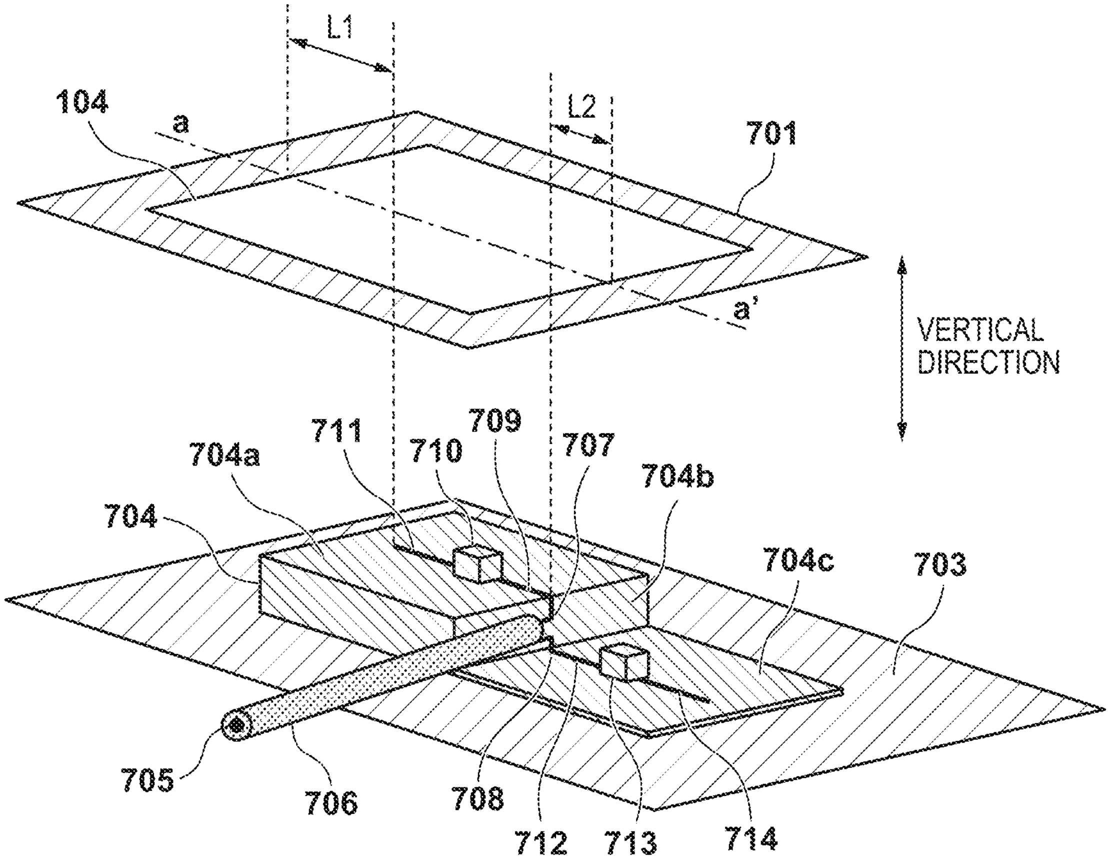
FIG. 7 is a view showing a modification of the antenna-incorporated device according to the first embodiment.

Subsequently, an arrangement in a case where a dual band antenna using a passive element is applied to the antenna 107 will be described with reference to FIG. 7. The resin portion 104 is arranged to seal an aperture formed in a conductor 701 as part of the conductor 101 as the top plane of the housing 100, and there exists a substrate 703 representing part of the substrate 109 to face the resin portion 104 in parallel. The substrate 703 may be a conductor such as another sheet metal arranged in the housing 100 or the bottom plane of the housing 100.

A support member 704 as a dielectric includes two planes having different heights, that is, horizontal planes 704*a* and 704*c*, and further includes a vertical plane that connects the horizontal planes 704*a* and 704*c*, that is, a vertical plane 704*b*.

A coaxial cable is formed from a core wire 705 and a jacket 706, and one end of the core wire 705 is connected to an antenna element 707 and one end of the jacket 706 is connected to an antenna element 708 on the vertical plane 704*b*.

The element 707 extends on the vertical plane 704*b* and is connected to an element 709 on the horizontal plane 704*a*, and the element 708 extends on the vertical plane 704*b* in a direction opposite to the element 707 and is connected to an element 712 on the horizontal plane 704*c*.

The element 709 extends on the horizontal plane 704*a*, and is connected to an inductor 710. The other end of the inductor 710 is connected to an element 711. The element 711 extends in the same direction as that of the element 709, and the other end of the element 711 has an open end that is not connected (that is open). The element 712 extends on the horizontal plane 704*c*, and is connected to an inductor 713. The other end of the inductor 713 is connected to an element 714. The element 714 extends in the same direction as that of the element 712, and the other end of the element 714 has an open end that is not connected (that is open).

The inductors 710 and 713 have a characteristic exhibiting a high impedance in a frequency band on the high frequency side among the RF signals transmitted/received by the high-frequency signal source.

The elements 707 to 714 are all conductors (copper thin films). A length obtained by adding the element lengths of the elements 707, 709, and 711 is substantially equal to a length obtained by adding the element lengths of the elements 708, 712, and 714, and each length is close to ¼ of the wavelength λl on the low frequency side among the RF signals transmitted/received by the high-frequency signal source.

A length obtained by adding the element lengths of the elements 707 and 709 is substantially equal to a length obtained by adding the element lengths of the elements 708 and 712, and each length is close to ¼ of the wavelength λh on the high frequency side among the RF signals transmitted/received by the high-frequency signal source.

By arranging the elements in this way, the elements 707 and 708 are arranged vertically and the elements 709, 711, 712, and 714 are arranged horizontally with respect to the resin portion 104 arranged in the aperture. Furthermore, each of the element lengths of the elements 707 and 708 on the vertical plane 704*b* is ⅛ or less of the wavelength λh on the high frequency side.

However, the present disclosure is not limited to this in a case where it is unnecessary to reduce the SAR on the high frequency side, for example, a case where the SAR is not the problem on the high frequency side or a case where there is no maximum radiation direction of the main beam on the high frequency side, and the element length need only be ⅛ or less of the wavelength λl on the low frequency side.

In this modification as well, assume that the relationship of L1>L2 holds and L2≥0 is obtained.

(Third Modification)

Figure 8:
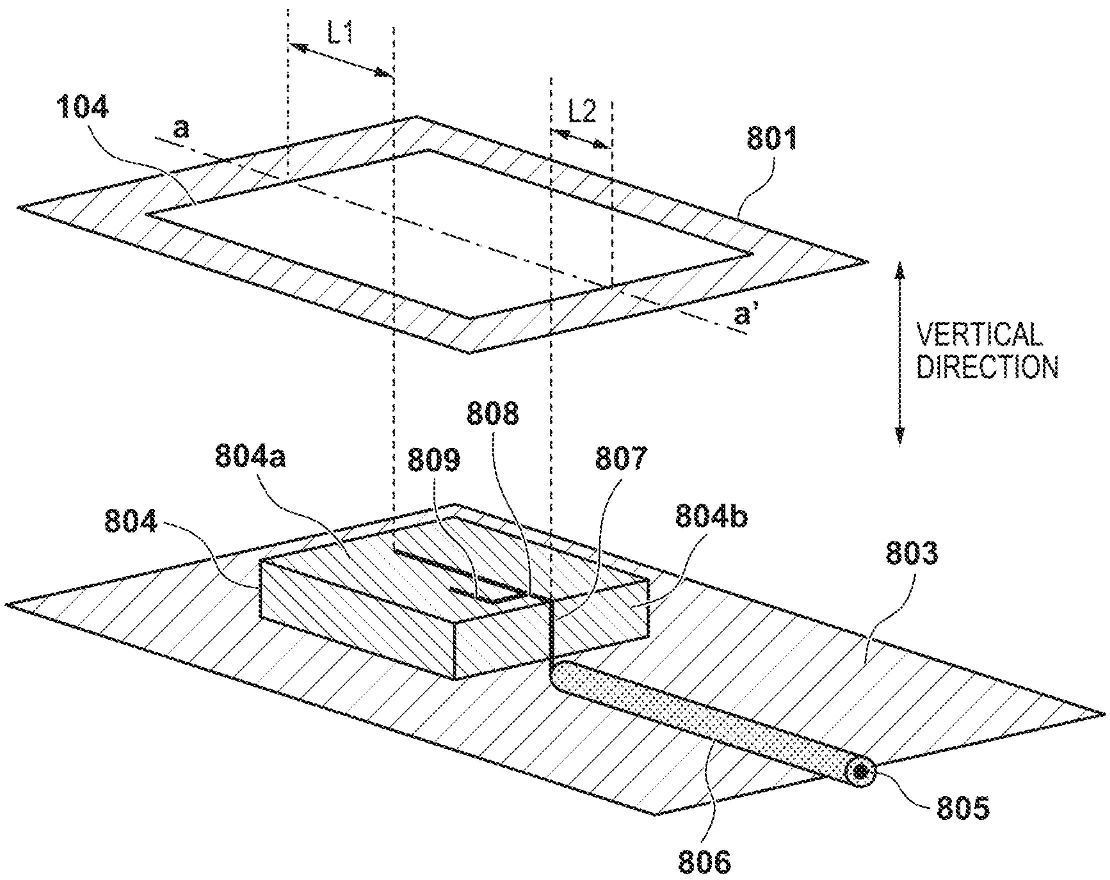
FIG. 8 is a view showing a modification of the antenna-incorporated device according to the first embodiment.

FIG. 8 shows a modification in a case where a branch-shaped monopole antenna is applied to operate in a plurality of frequency bands. This example assumes that a two-branch monopole antenna is applied to operate in dual bands.

A conductor 801 represents part of the conductor 101 as the top plane of the housing 100. The resin portion 104 is arranged in the conductor 801 to seal an aperture of the conductor. A substrate 803 is arranged to face the resin portion 104 in parallel. However, the substrate 803 may be another sheet metal arranged in the housing 100, or the conductor 102 of the bottom plane of the housing 100.

A support member 804 as a dielectric includes a horizontal plane 804*a* as a plane parallel to the resin portion 104, and further includes a plane that is vertically connected to the horizontal plane 804*a*, that is, a vertical plane 804*b*.

A coaxial cable is formed from a core wire 805 and a jacket 806, and one end of the core wire 805 is connected to an antenna element 807 and one end of the jacket 806 is connected to the substrate 803 on the vertical plane 804*b*. Note that although not shown in FIG. 8, a balun such as a sleeve balun may be provided near the connecting portions of the coaxial cable to the elements 807 and an element 803.

The element 807 extends on the vertical plane 804*b* in the vertical direction with respect to the resin portion 104, and is connected to the element 808 and an element 809 branched from the element 808 on the horizontal plane 804*a*. The element length of the element 808 is longer than that of the element 809.

The elements 807, 808, and 809 are all conductors (copper thin films). The sum of the element lengths of the elements 807 and 808 is close to ¼ of the wavelength λl on the low frequency side among the RF signals transmitted/received by the high-frequency signal source. That is, in this embodiment, the design method of a ¼ wavelength monopole antenna can be used for the antenna 107.

Furthermore, the sum of the element lengths of the elements 807 and 809 is close to ¼ of the wavelength λh on the high frequency side among the RF signals transmitted/received by the high-frequency signal source. As a result, the elements 808 and 809 are arranged horizontally in a direction in which the element 807 intersects the resin portion 104. In this modification as well, the relationship of L1>L2 holds, and L2≥0 is obtained.

(Fourth Modification)

Figure 9:
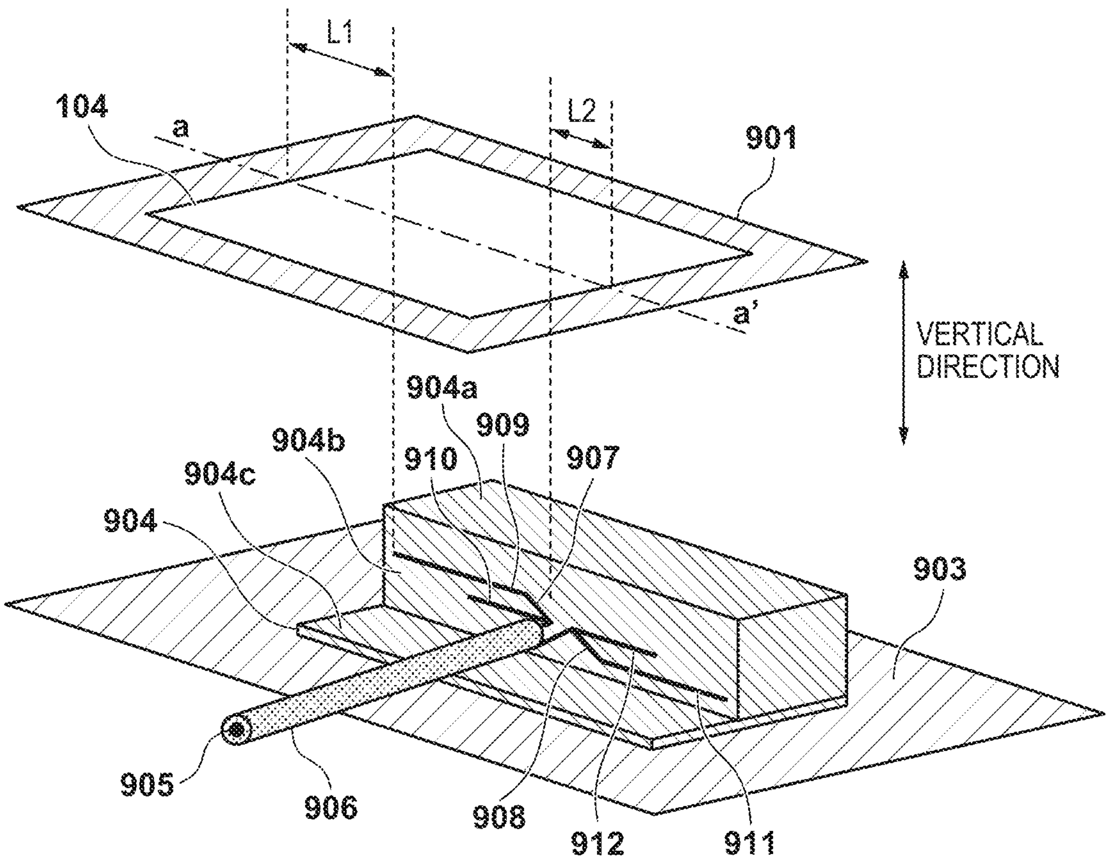
FIG. 9 is a view showing a modification of the antenna-incorporated device according to the first embodiment.

FIG. 9 shows a modification in a case where a branch-shaped dipole antenna is applied to operate in a plurality of frequency bands. This example assumes that a two-branch dipole antenna is applied to operate in dual bands. Note that the fourth modification will describe the arrangement of the antenna in a case where it is unnecessary to reduce the SAR on the high frequency side but it is necessary to reduce the SAR on the low frequency side.

In FIG. 9, a conductor 901 represents part of the conductor 101 as the top plane of the housing 100, and there exists a substrate 903 as part of the substrate 109 arranged to face the conductor 901 in parallel. The substrate 903 may be a conductor such as another sheet metal arranged in the housing 100 or the bottom plane of the housing 100.

A support member 904 as a dielectric includes two planes having different heights, that is, horizontal planes 904*a* and 904*c*, and further includes a vertical plane that connects the horizontal planes 904*a* and 904*c*, that is, a vertical plane 904*b*.

A coaxial cable is formed from a core wire 905 and a jacket 906, and one end of the core wire 905 is connected to antenna elements 907 and 910 and one end of the jacket 906 is connected to antenna elements 908 and 912 on the vertical plane 904*b*.

The element 907 extends on the vertical plane 904*b* in a direction intersecting a plane on which the resin portion 104 is arranged, and is connected to an element 909. The element 908 extends on the vertical plane 904*b* in a direction opposite to the element 907, and is connected to an element 911. The element 910 extends along the resin portion 104 in parallel to the element 909. The element 912 extends in parallel to the element 911. Note that the elements 910 and 912 have the same axis.

Note that the element 909 is longer than the element 910, and the element 911 is longer than the element 912. The elements 907 to 912 are all conductors (copper thin films).

A length obtained by adding the element lengths of the elements 907 and 909 is substantially equal to the total length of the element lengths of the elements 908 and 911, and each length is close to λl/4 where λl represents the wavelength of the radio signal on the low frequency side among the RF signals transmitted/received by the high-frequency signal source. Furthermore, the element length of the element 910 is substantially equal to that of the element 912, and each length is close to λh/4 where λh represents the wavelength of the radio signal on the high frequency side among the RF signals transmitted/received by the high-frequency signal source.

As a result, the elements 907 and 908 are arranged in a direction intersecting the resin portion 104, and the elements 909 to 912 are arranged horizontally with respect to the resin portion 104.

Note that each of the element lengths of the elements 907 and 908 is shorter than ⅛ (λh/8) of the wavelength on the high frequency side. The element length of the element 909 is longer than that of the element 907, and the element length of the element 911 is longer than that of the element 908. This can reduce the SAR on the low frequency side of the antenna-incorporated device 1 without largely changing the directivity.

In this modification as well, assume that L1>L2 and L2≥0.

According to this modification, it is possible to suppress a decrease in the SAR on the high frequency side while reducing the SAR on the low frequency side. Furthermore, the antenna 107 can be formed by a planar antenna by arranging the antenna on the vertical plane 904*b*.

Second Embodiment

Figure 10:
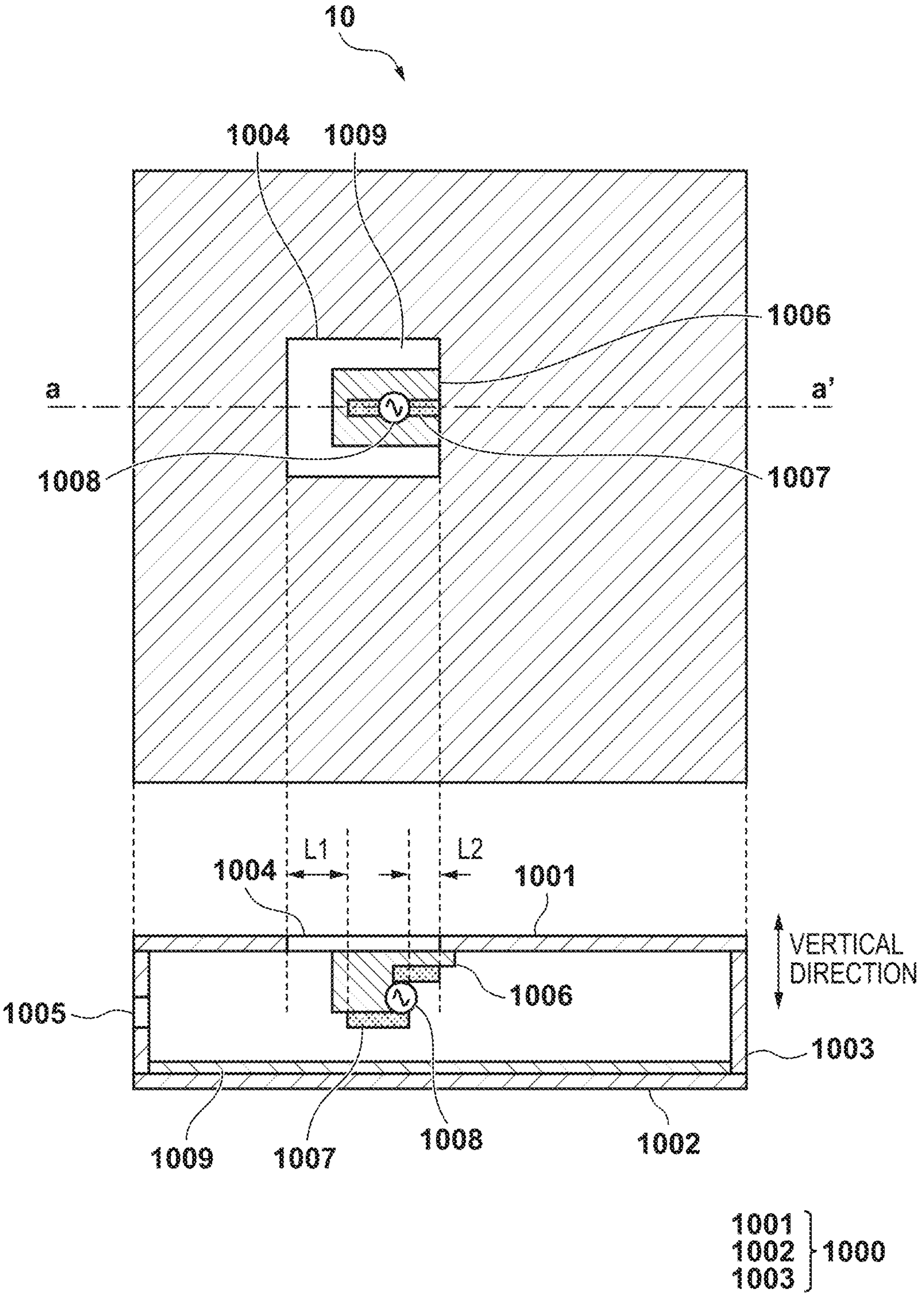
FIG. 10 is a view showing a modification of the antenna-incorporated device according to the second embodiment.

FIG. 10 shows a plan view of a housing of an antenna-incorporated device including an antenna and a sectional view of the housing taken along a line a-a' in the plan view according to this embodiment. An antenna-incorporated device 10 includes a housing 1000, a support member 1006, an antenna 1007, an electric power supplying unit 1008, and a substrate 1009. The support member 1006, the antenna 1007, the electric power supplying unit 1008, and the substrate 1009 are arranged in the housing 1000.

The housing 1000 is formed from a conductor 1001 of a top plane, a conductor 1002 of a bottom plane parallel to the conductor 1001, and a conductor 1003 that connects the conductors 1001 and 1002 in a thickness direction on the whole circumference. In this embodiment, the conductors 1001, 1002, and 1003 are all made of a steel material, the conductors 1001 and 1002 have a size of 300 mm×300 mm in the plan view, and the conductor 1003 has a size of 6 mm×1.5 mm in the sectional view. The conductor 1001 includes an aperture portion of 60 mm×60 mm, and the conductor 1003 includes an aperture portion of 60 mm (in a depth direction in the sectional view)×5 mm. Each aperture portion is sealed with a resin portion 1004 or 1005 as a dielectric.

The support member 1006 is a staircase-shaped dielectric, and is a holding portion arranged on the conductor 1001 or the resin portion 1004 at a position where the antenna 1007 overlaps the resin portion 1004 in the plan view.

The antenna 1007 is a dipole antenna, and is adhered to the support member 1006 so that the electric power supplying unit 1008 is vertical to the resin portion 1004 to emit a high-frequency signal as an electromagnetic wave.

With respect to the dipole antenna of the antenna 1007, the element lengths from the electric power supplying unit 1008 to the open ends of the respective antenna elements are substantially equal to each other, and are close to ¼ of the wavelength of an RF signal transmitted by a high-frequency signal source. More specifically, an element length from the electric power supplying unit 1008 to ⅛ of the wavelength of each antenna element is arranged along the support member 1006 vertically with respect to the resin portion 1004, and a remaining region of ⅛ of the wavelength including the open end of each antenna element is arranged along the support member 1006 in parallel to the resin portion 1004. As the area of the aperture where the resin portion 1004 or 1005 as a dielectric is arranged is larger, it is possible to improve the radiation characteristic of emitting the electromagnetic wave from the antenna 1007 outside the antenna-incorporated device 10. In an example, each of the four sides of the resin portion 1004 has a length of $\lambda/2$ or more.

The substrate 1009 is a wireless module in which an electric circuit (not shown) for controlling the operation of the housing and mounted components (not shown) are arranged, and serves as a high-frequency signal source that transmits/receives a high-frequency signal to be supplied to the electric power supplying unit 1008. The substrate 1009 is fixed to the conductor 1002, and the substrate 1009 and the electric power supplying unit 1008 are connected by a coaxial line. Note that the substrate 1009 may include a module having a function other than a function of transmitting/receiving a high-frequency signal, and may be formed by a plurality of substrates.

For example, if the antenna-incorporated device 10 is used for digital radiography or the like, the conductor 1002 may be used as an irradiated plane that receives X-rays. In this case, an image processing circuit of the X-rays is included in the substrate 1009.

In this example, the resin portion 1004 is located in the upper portion of the support member 1006, and L1 represents a length from the open end of the antenna 1007 to a closest side (end portion) of the resin portion 1004 in the extending direction of the antenna 1007 when viewed from above in FIG. 10. Similarly, L2 represents a length from the electric power supplying unit 1008 to a closest side (end portion) of the resin portion 1004 in a portion of ⅛ of the wavelength $\lambda$ of each antenna element.

In this embodiment, assume that $L1>L2$ and $L2\geq 0$.

Similar to the first embodiment, if observation is performed in the near field of the antenna 1007, that is, at a position close to the resin portion 1004 outside the housing 1000, an electric field component in a direction parallel to the resin portion 1004, that is, in the horizontal direction contributes to the SAR more than an electric field component in the vertical direction. Therefore, by arranging a portion of ⅛ of the wavelength $\lambda$ of the antenna element connected to the electric power supplying unit 1008 in a direction intersecting the resin portion 1004, it is possible to attenuate the electric field component parallel to the resin portion 1004, and reduce the SAR. On the other hand, if observation is performed in the far field of the antenna 1007, the main beam emitted by the antenna 1007 is maintained in a direction penetrating the resin portion 1004.

Other Embodiments

The embodiments of the present disclosure have been described above. However, the present disclosure is not limited to these embodiment, and various modifications and changes can be made within the spirit and scope of the present disclosure.

For example, FIG. 1 shows an example in which one aperture portion is formed in the conductor 101. However, a plurality of aperture portions may be formed. If, for example, the antenna-incorporated device 1 includes a plurality of antennas 107, an aperture portion may be formed for each antenna 107.

The antenna according to each of the first to fourth modifications may be applied to the antenna 1007 of the second embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-086232, filed on May 26, 2022, which is hereby incorporated by reference herein in its entirety.

What is claimed is:

1. A communication device including a conductive housing and an antenna device, the antenna device arranged in the conductive housing, the housing including a first plane and a second plane facing the first plane, and a conductor of the first plane being provided with at least one aperture, the antenna device comprising:

a first element including a first electric power supplying terminal and extending in a direction intersecting the first plane; and a second element including a first open end, connected to the first element, and extending along the first plane, wherein the first element and the second element are arranged at positions overlapping the aperture in a direction vertical to the first plane, and wherein a shortest distance from the first open end of the second element to an end portion of the aperture is longer than a shortest distance from the first electric power supplying terminal of the first element to another end portion of the aperture when viewed from a direction vertical to the first plane.

2. The communication device according to claim 1, wherein the housing has a substantially rectangular parallelepiped shape, and a distance between the first plane and the second plane is less than or equal to ¼ of a wavelength of an electromagnetic wave transmitted/received by the communication device.

3. The communication device according to claim 1, wherein the aperture is rectangular, and a length of each side of the aperture is less than or equal to ½ of a wavelength of an electromagnetic wave transmitted/received by the communication device.

4. The communication device according to claim 1, wherein a length of the first element is shorter than a length of the second element, and is less than or equal to ⅛ of a wavelength of an electromagnetic wave transmitted/received by the antenna device.

5. The communication device according to claim 1, wherein the second element emits an electromagnetic wave including an electric field component parallel to the first plane.

6. The communication device according to claim 1, wherein the aperture is covered with a dielectric.

7. The communication device according to claim 1, wherein a holding portion configured to hold the antenna device is arranged on the second plane of the housing.

8. The communication device according to claim 1, wherein a holding portion configured to hold the antenna device is arranged on the first plane of the housing.

9. The communication device according to claim 1, wherein the antenna device is a dipole antenna further including a third element having a second electric power supplying terminal and extending in a direction intersecting the first plane, and a fourth element having a second open end, connected to the third element, and extending along the first plane.

10. The communication device according to claim 9, wherein an extending direction of the first element from the first electric power supplying terminal is different from an extending direction of the third element from the second electric power supplying terminal.

11. An antenna-incorporated device comprising:

a conductive housing that includes a first plane and a second plane facing the first plane and in which a conductor of the first plane is provided with at least one aperture; and an antenna device arranged in the housing, and including:

a first element having a first electric power supplying terminal and extending in a direction intersecting the first plane, and a second element having a first open end, connected to the first element, and extending along the first plane, wherein the first element and the second element are arranged at positions overlapping the aperture in a direction vertical to the first plane, and wherein a shortest distance from the first open end of the second element to an end portion of the aperture is longer than a shortest distance from the first electric power supplying terminal of the first element to another end portion of the aperture when viewed from a direction vertical to the first plane.

* * * * *